: US 9,392,420 B2
: Jul. 12, 2016

(12) United States Patent
Fodor et al.

(10) Patent No.: US 9,392,420 B2
(45) Date of Patent: Jul. 12, 2016

(54) CLOSED SUBSCRIBER GROUP (CSG) HANDLING FOR SUPPORTING NETWORK SHARING OF HOME BASE STATIONS

(75) Inventors: Gabor Fodor, Hässelby (SE); Gunnar Mildh, Sollentuna (SE); Jari Vikberg, Järna (SE); Tomas Hedberg, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 941 days.

(21) Appl. No.: 13/074,060

(22) Filed: Mar. 29, 2011

(65) Prior Publication Data

US 2012/0157095 A1 Jun. 21, 2012

Related U.S. Application Data

(60) Provisional application No. 61/424,148, filed on Dec. 17, 2010.

(51) Int. Cl.
*H04W 4/00* (2009.01)
*H04W 4/08* (2009.01)

(52) U.S. Cl.
CPC ...................................... *H04W 4/08* (2013.01)

(58) Field of Classification Search
CPC ...... H04W 48/18; H04W 48/16; H04W 88/06
USPC ................ 455/435.2, 435.1, 436, 442, 432.1, 455/422.1
See application file for complete search history.

(56) References Cited

U.S. PATENT DOCUMENTS 8,036,656 B2 * 10/2011 Jeong et al. .................... 455/434
2009/0238114 A1 * 9/2009 Deshpande et al. .......... 370/328

OTHER PUBLICATIONS

Samsung. RAN Sharing for H(e)Nb. 3GPP Draft; R2-106594. 3rd Generation Partnership Project. Nov. 9, 2010.
3GPP. 3rd Generation Partnership Project; Technical Specification Group Radio Access Network; Evolved Universal Terrestrial Radio Access (E-UTRA); Radio Resource Control (RRC); Protocol Specification (Release 9). 3GPP TS 36.331 v9.4.0 (Sep. 2010).

\* cited by examiner

*Primary Examiner* — Nghi H Ly

(57) ABSTRACT

A system and method for enhanced support for handling of Closed Subscriber Groups (CSGs) and sharing of Radio Access Network (RAN) for home base stations and other small cells. An enhanced System Information (SI) structure indicates multiple CSG IDs and CSG Indications, thereby making it possible to support different CSG IDs and CSG Indications for every Public Land Mobile Network Identity (PLMN-ID) and also to support a PLMN-ID with multiple associated CSG IDs and CSG Indications. The enhanced SI makes it possible to have different CSG IDs for different operators, to have multiple CSG IDs for one operator (i.e., a single PLMN), and to selectively use the CSG concept for some PLMNs (as given by their respective CSG Indications), but not for all. A network of base stations (e.g., a RAN) thus can be effectively shared by multiple operators, leading to better cellular coverage, peak rates, and capacity.

23 Claims, 6 Drawing Sheets

CLOSED SUBSCRIBER GROUP (CSG) HANDLING FOR SUPPORTING NETWORK SHARING OF HOME BASE STATIONS

CROSS-REFERENCE TO RELATED APPLICATIONS

This application claims the priority benefit under 35 U.S.C. §119(e) of U.S. Provisional Application No. 61/424,148 filed Dec. 17, 2010, the disclosure of which is incorporated herein by reference in its entirety.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND

The present invention relates to sharing of home base stations in wireless networks. More particularly, and not by way of limitation, the present invention is directed to a system and method to support sharing of home base stations among multiple cellular networks via enhanced handling of Closed Subscriber Group (CSG) related information in System Information (SI).

The usage of mobile broadband services using cellular networks has shown a significant increase during recent years. In parallel to this, there is an ongoing evolution of Third Generation (3G) and Fourth Generation (4G) cellular networks like High Speed Packet Access (HSPA), Long Term Evolution (LTE), Worldwide Interoperability for Microwave Access (WiMAX), etc., to support ever-increasing performance with regards to capacity, peak bit rates and coverage. Operators deploying these networks are faced with a number of challenges, e.g., related to site costs and availability, transport costs and availability, lack of wireless spectrum, etc. Many different techniques are considered for meeting these challenges and providing cost-efficient mobile broadband.

One option available to the operators is to use shared network infrastructure and sites, especially when multiple cellular operators agree to deploy their network together. This is beneficial since it reduces the total deployment costs, and can provide benefits due to pooling of the available spectrum. One drawback with network sharing in its current form is that it requires quite a lot of cooperation between the operators sharing the network. Because the network configuration is common for a part of the network that is shared, it may make it difficult to differentiate the treatment of users from each operator. The sharing of a part of the network may also make interaction (e.g., handover) with non-shared part more complex, since the shared part needs to interact with multiple non-shared networks (managed by multiple operators).

The support for network sharing has been enhanced in the Third Generation Partnership Project's (3GPP) Universal Terrestrial Radio Access Network (UTRAN) and Evolved UTRAN (E-UTRAN) standards and is defined in, for instance, 3GPP's Technical Specifications (TS) 23.251, 23.401 and 36.300 (these and other specifications may be obtained at ftp://ftp.3gpp.org/Specs/latest). The UTRAN and E-UTRAN standards allow different scenarios for network sharing, but it is expected that a common scenario will be when the Radio Access Network (RAN) is shared and each operator has its own Core Network (CN). This scenario, which is called Multi-Operator Core Network (MOCN) in 3GPP, is illustrated in FIG. 1. In the MOCN configuration of FIG. 1, an operator X's RAN 10 is shared by operator-specific Core Networks 12-14 from three different operators—operator A, operator B, and operator C. In an MOCN configuration, multiple CN nodes (e.g., nodes 12-14) may be connected to the same Radio Network Controller (RNC) (not shown) in the shared RAN (e.g., RAN 10 in FIG. 1), even when these CN nodes are operated by different network operators. It is observed here that MOCN is a network-sharing configuration in which only the RAN is shared, as opposed to Gateway Core Network (GWCN)—a network-sharing configuration in which parts of the operator core networks are also shared.

From a technical point of view, the MOCN configuration uses the multi-to-multi connectivity of the UTRAN's Iu (as described, for example, in 3GPP TS 25.413) and E-UTRAN's S1 (as described, for example, in 3GPP TS 36.413) interfaces between the RAN and CN as exemplarily illustrated by the dotted line 16 in FIG. 1. The MOCN configuration thus makes it possible to connect a RAN node (e.g., an RNC or an Evolved Node-B (eNB or eNodeB) (not shown in FIG. 1)) to multiple CN nodes (e.g., Serving GPRS Support Node (SGSN) wherein "GPRS" refers to General Packet Radio Service, Mobility Management Entity (MME), etc.) belonging to different operators. The RAN will, in this configuration, broadcast one Public Land Mobile Network (PLMN) identity (ID) for each operator sharing the RAN (as described, for example, in TS 25.331 and TS 36.331). As is known, a PLMN is a wireless communication system (e.g., a cellular telephone network) operated by a network operator and intended for use by terrestrial subscribers in vehicles or on foot. In response to RAN's broadcast of PLMN IDs, the User Equipment (UE) or mobile handset will, at initial attach, select which PLMN it wants to connect to, and the RAN will make sure that the initial attach signaling is routed to the correct operator's CN (as described, for example, in TS 23.401 and 23.060). Once the UE has been assigned a CN node, there are also mechanisms making it possible for the RAN and CN to route subsequent signaling related to this UE to the same CN node. Besides the list of PLMN IDs, almost all of the rest of the system information (as described, for example, in TS 25.331 and 36.331) broadcasted on the cell broadcast channel (e.g., the Physical Broadcast Channel (PBCH)) in the shared RAN is common for all operators sharing the RAN. However, currently there are a few exceptions to this common treatment for all operators. For example, in E-UTRAN, the parameter "cellReservedForOperatorUse" is per PLMN (i.e., it is an operator's PLMN-specific). Similarly, in UTRAN, the parameters "Domain Specific Access Restriction Parameters For Operator N" and "Paging Permission with Access Control Parameters For Operator N" are also per PLMN.

Another option available to an operator for network-sharing is the deployment of home base stations (e.g., Home eNB or HeNB (in LTE), Home Node-B or HNB (in HSPA), or a femtocell (as this names is used by www.femtoforum.org)) or other small base stations complementing the traditional macro cellular network. Possible benefits of these small base stations or home base stations are lower site costs due to smaller physical size and lower output power, as well as increased capacity and coverage due to the closer deployment to the end user. The operator can configure the cells with these smaller base stations as Open, Hybrid or Closed. Open cells are possible to use for all subscribers, with no preference to perform cell reselection of individual cells. Closed cells broadcast a Closed Subscriber Group (CSG) cell type (called "CSG Indication" that can either indicate values "true" or "false") and CSG identity (called "CSG ID" that may be a 27-bit identifier). Closed cells are only available for mobile handsets or UEs belonging to the specific CSG. When the cell is closed, the CSG Indication broadcasted has the value "true". In addition, users belonging to a CSG have a preference for selecting CSG cells with the same CSG ID. Hybrid cells, on the other hand, may broadcast a CSG ID value, but the CSG Indication broadcasted has the value "false". Thus, hybrid cells may be available for all users.

Since it is expected that the number of home base stations could be very large and that they are considered less reliable nodes, solutions have been introduced in 3GPP's E-UTRAN and UTRAN standards for home base stations to connect to the CN via a home base station gateway (GW) (e.g., the H(e)NB GW in E-UTRAN or HNB GW in UTRAN). The H(e)NB GW or HNB GW has the functionality to hide the home base station from the rest of the network.

In the LTE/System Architecture Evolution (SAE) case, the HeNB GW is optional and therefore has S1-interfaces on both sides of it. FIG. 2 shows an HeNB logical architecture in which an HeNB GW 18 is shown connected to an HeNB 20 and a Core Network 22 via S1 interfaces 23 and 24, respectively. When HeNB GW is implemented, for the rest of the network, the HeNB GW just looks like a large eNB with many cells. From the HeNB point of view, the HeNB GW looks like a CN node (MME). The HeNB may only connect to one HeNB GW and, in this case, the HeNB may not have the network node selection functionality that can allow the HeNB to connect to multiple HeNB GW nodes. Instead, the HeNB GW supports the network node selection functionality enabling support for MME-pools (e.g., from multiple Core Networks). On the other hand, when the HeNB connects directly to the CN (i.e., when HeNB GW is omitted), the HeNB may itself support the network node selection functionality.

In the HSPA/Wideband Code Division Multiple Access (WCDMA) case, the HNB GW is mandatory. A new Iuh-interface is defined between the HNBs and the HNB GW, and the normal Iuh-interface is used between the HNB GW and the CN. FIG. 3 depicts an HNB logical diagram in which an HNB GW 26 is shown connected to an HNB 28 via an Iuh interface 29 and to a Core Network 30 via an Iu interface 32. When HNB GW is present, for the rest of the network, the HNB GW just looks like a large RNC with, potentially, many service areas (that is the UTRAN concept for one or multiple cells). The HNB only connects to one HNB GW, and the HNB does not have the network node selection functionality that can allow the HNB to connect to multiple HNB GW nodes. Instead, the HNB GW supports the network node selection functionality enabling support for Mobile Switching Center (MSC)- and SGSN-pools (e.g., from multiple Core Networks).

SUMMARY

As discussed above, although RAN sharing may be available to some extent for home base stations (e.g., HeNBs, HNBs, femtos, etc.), the current 3GPP standard still does not offer good support for RAN sharing for home base stations and other small cells.

One of the problems with the current 3GPP standard is that it is not possible to apply different CSG IDs for the same or different operators. Because of this limitation, the operators would need to coordinate the management of CSG IDs among themselves in case of network-sharing. This coordination also requires interactions with each operator CN because the MME (in a CN) is responsible for determining whether a given UE is allowed to access a given CSG ID. In the single operator case, this current 3GPP limitation means that it is not possible to support partially overlapping CSG areas with different CSG IDs.

Another problem is that it is not possible today in a shared HeNB to operate in Open Access for users belonging to one of the PLMNs and Closed Access for users belonging to another PLMN.

The above-mentioned problems arise because, in the current E-UTRAN implementation, the System Information (SI) from the base station can include up to six (6) different PLMN Identities (PLMN IDs), but can only include a single CSG Indication and a single CSG ID. FIG. 4 illustrates various System Information Blocks (SIBs) of an SI 40 in E-UTRAN. As shown in FIG. 4, the SI 40 may include a Master Information Block (MIB) followed by different types of SIBs—SIB1 (System Information Block type-1), SIB2 (System Information Block type-2), etc. As is known, the SIB1 may contain information relevant when evaluating if a UE is allowed to access a cell, and may also define the scheduling of other system information blocks. In FIG. 4, the SIB1 is shown to include a "cellAccessRelatedInformation" field and other fields (not shown in detail) such as, for example, a "cellSelectionInfo" field, a "frequencyBandIndicator" field, etc. The "cellAccessRelatedInformation" field may include additional fields such as, for example, a "PLMN-Identity List" field, a Tracking Area Code (TAC) field (which is common for all PLMNs listed), a "CellIdentity" (Cell-ID) field, a "CSG Indication" field, a "CSG-ID" field, etc. The six different PLMN IDs (PLMN-ID 1 through PLMN-ID 6) may be provided through the "PLMN-ID List" field, and each PLMN-ID may include a field to convey three (3) decimal digits of Mobile Country Code (MCC) and 2 or 3 decimal digits of Mobile Network Code (MNC), wherein each decimal digit (from 0 through 9) may be represented by up to four binary bits.

There is currently a debate in 3GPP whether HeNBs (in "Hybrid" or "Closed" mode) can be shared among operators (see, for example, the discussion in document numbers G2-100392, R3-103428, R2-106594, R2-106616, and R2-106942 in 3GPP release-9). In the current 3GPP standard, the first listed PLMN-ID (i.e., PLMN-Id1 in FIG. 4) identifies the "primary" PLMN to which the cell belongs. RAN2 (related to Radio layer 2 and Radio layer 3 Radio Resource) agreed in RAN2 meeting #72 that the "CSG-ID" in the SIB1 only applies to the identity of a CSG within this primary PLMN of the cell. The CSG-ID field is present in a CSG cell, and may be absent if the cell is not a CSG cell. Hence, the UE reports the primary PLMN to the RAN node (e.g., an HeNB) on the source side (see, for example, the discussion in 3GPP rel-9 document number R2-106942). However, currently, at UE registration, the UTRAN HNB GW still must look into the 'Initial UE message' to determine the selected Core Network. Furthermore, at handover from one Registered PLMN (RPLMN) (discussed later below) to another PLMN using 'Inbound Handover' procedure, it is unclear in current 3GPP standard how the target PLMN is determined.

It is therefore desirable to devise a methodology for enhanced support for RAN-sharing for home base stations and other small cells. The single CSG-ID based approach (as shown in FIG. 4) in current 3GPP may not provide the flexibility needed to offer enhanced network-sharing for home base stations or other small cells.

The present invention provides a solution to the above-mentioned problem of lack of enhanced support in the current 3GPP standard for CSG-handling and network-sharing for home base stations. In one embodiment, the present invention provides different CSG IDs (instead of the single CSG-ID as shown in FIG. 4) for the same or different operators. Different CSG IDs for different operators may reduce requirements for extensive coordination among operators during network-sharing. In case of a single operator, different CSG IDs can be useful when the operator wants to enable CSG-specific access restrictions to some cells (i.e., for some users), but wants to allow other cells to be shared by different CSG IDs (i.e., making them available to more users). Furthermore, selective access to a shared HeNB may be supported through multiple CSG IDs. Such support many be desirable in cases when operators have different service layer agreements with the owner of the HeNB. For instance, if the HeNB operates in one operator spectrum, it might be desirable for this operator to use Open or Hybrid Access, but at the same time offer the possibility to other operator to support Closed Access.

In one embodiment, the present invention is directed to a method of communicating CSG-related information with a UE. Using a processor that is in wireless communication with the UE, the method comprises the steps of: providing SI to the UE containing at least one of the following: a PLMN-specific CSG-ID parameter for each of a plurality of PLMNs identified in the SI, and a PLMN-specific CSG Indication parameter for each of the plurality of PLMNs identified in the SI; and, receiving from the UE an intimation of a PLMN selected by the UE from the plurality of PLMNs identified in the SI.

In another embodiment, the present invention is directed to a method of communicating CSG-related information with a processor that is in wireless communication with a UE. The method comprises: the UE receiving SI from the processor containing at least one of the following: a PLMN-specific CSG-ID parameter for each of a plurality of PLMNs identified in the SI, and a PLMN-specific CSG Indication parameter for each of the plurality of PLMNs identified in the SI; and, the UE sending to the processor an intimation of a PLMN selected by the UE from the plurality of PLMNs identified in the SI.

In a further embodiment, the present invention is directed to a mobile communication node configured to provide a radio interface to a UE. The mobile communication node comprises a processor capable of providing SI to the UE containing at least one of the following: a PLMN-specific CSG-ID parameter for each of a plurality of PLMNs identified in the SI, and a PLMN-specific CSG Indication parameter for each of the plurality of PLMNs identified in the SI. The mobile communication node also comprises a receiver capable of receiving from the UE an intimation of a PLMN selected by the UE from the plurality of PLMNs identified in the SI.

In another embodiment, the present invention is directed to a UE that is wirelessly operable with a mobile communication node via a radio interface provided by the mobile communication node. The UE comprises a receiver capable of receiving SI from the mobile communication node containing at least one of the following: a PLMN-specific CSG-ID parameter for each of a plurality of PLMNs identified in the SI, and a PLMN-specific CSG Indication parameter for each of the plurality of PLMNs identified in the SI. The UE also comprises a processor capable of sending to the mobile communication node an intimation of a PLMN selected by the UE from the plurality of PLMNs identified in the SI.

In another embodiment, the present invention is directed to a system comprising a mobile communication node configured to provide a radio interface to a mobile handset; and the mobile handset wirelessly operable with the mobile communication node via the radio interface provided thereby. The mobile communication node is configured to also provide SI to the mobile handset containing at least one of the following: a PLMN-specific CSG-ID parameter for each of a plurality of PLMNs identified in the SI, and a PLMN-specific CSG Indication parameter for each of the plurality of PLMNs identified in the SI. The mobile handset is configured to send to the mobile communication node an intimation of a PLMN selected by the mobile handset from the plurality of PLMNs identified in the SI.

The present invention thus enables indication of multiple CSG IDs and CSG Indications in the System Information (SI) sent on the cell broadcast channel, thereby making it possible to support different CSG IDs and CSG Indications for every PLMN Identity (PLMN-ID) and also to support a PLMN-ID with multiple associated CSG IDs and CSG Indications. This makes it possible to have different CSG IDs for different operators and even to have multiple CSG IDs for one operator (i.e., a single PLMN). The present invention also makes it possible to selectively use the CSG concept for some PLMNs (as given by their respective CSG Indications), but not for all. The present invention thus improves the possibility to cost-effectively provide enhanced support for RAN-sharing for HeNBs or other base stations using a network's existing radio resources and signaling framework (i.e., without significant disruption to network architecture or functionality). This enhanced support may be useful in opening up new business cases where third party operators deploy a network of base stations (e.g., a RAN) that can be shared by multiple operators, leading to better cellular coverage, peak rates, and capacity.

BRIEF DESCRIPTION OF THE DRAWINGS

In the following section, the invention will be described with reference to exemplary embodiments illustrated in the figures, in which.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention. Additionally, it should be understood that although the invention is described primarily in the context of a cellular telephone/data network, the invention can be implemented in other forms of wireless networks as well (for example, a corporate-wide wireless data network, a satellite communication network, and the like).

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) in various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "CSG-ID") may be occasionally interchangeably used with its non-hyphenated version (e.g., "CSG ID"), and a capitalized entry (e.g., "ID") may be interchangeably used with its non-capitalized versions (e.g., "id" or "Id"). Such occasional interchangeable uses shall not be considered inconsistent with each other.

It is noted at the outset that the terms "coupled," "connected", "connecting," "electrically connected," etc., are used interchangeably herein to generally refer to the condition of being electrically connected. Similarly, a first entity is considered to be in "communication" with a second entity (or entities) when the first entity electrically sends and/or receives (whether through wireline or wireless means) information signals (whether containing voice information or non-voice data/control information) to the second entity regardless of the type (analog or digital) of those signals. It is further noted that various figures (including component diagrams) shown and discussed herein are for illustrative purpose only, and are not drawn to scale.

Figure 5:
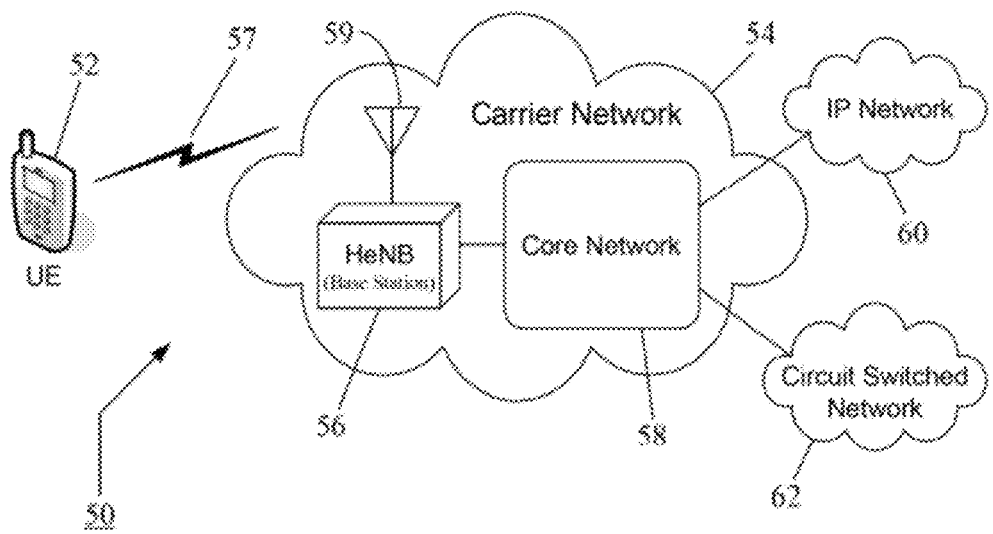
FIG. 5 is a diagram of an exemplary wireless system in which enhanced CSG handling according to the teachings of one embodiment of the present invention may be implemented.

FIG. 5 is a diagram of an exemplary wireless system 50 in which enhanced CSG handling according to the teachings of one embodiment of the present invention may be implemented. The system 50 may include a mobile handset 52 that is in wireless communication with a carrier network 54 of a wireless service provider (or operator) through a communication node 56 of the carrier network 54. The communication node 56 may be, for example, a base station in a 3G network, or an evolved Node-B (eNodeB) or Home eNodeB (HeNB) when the carrier network is a Long-Term Evolution (LTE) network, or any other home base station or femtocell, and may provide radio interface to the mobile handset 52. In other embodiments, the communication node 56 may also include a site controller, an access point (AP), or any other type of radio interface device capable of operating in a wireless environment. It is noted here that the terms "mobile handset," "wireless handset," and "user equipment (UE)" may be used interchangeably herein to refer to a wireless communication device that is capable of voice and/or data communication via a wireless carrier network. Some examples of such mobile handsets include cellular telephones or data transfer equipments (e.g., a Personal Digital Assistant (PDA) or a pager), smartphones (e.g., iPhone™, Android™, Blackberry™, etc.), computers, or any other type of user devices capable of operating in a wireless environment. Similarly, the terms "wireless network" or "carrier network" may be used interchangeably herein to refer to a wireless communication network (e.g., a cellular network) facilitating voice and/or data communication between two user equipments (UE's).

In addition to providing air interface (e.g., as represented by a wireless link 57 in FIG. 5) to the UE 52 via an antenna 59, the communication node 56 may also perform radio resource management (as, for example, in case of an eNodeB or HeNB in an LTE system) such as, for example, through transmission of System Information (SI) mentioned hereinbefore. In case of a 3G carrier network 54, the communication node 56 may include functionalities of a 3G base station along with some or all functionalities of a 3G Radio Network Controller (RNC) to perform the enhanced CSG handling through enhanced SI structures discussed below. Communication nodes in other types of carrier networks (e.g., 4G networks and beyond) also may be configured similarly. In one embodiment, the node 56 may be configured (in hardware, via software, or both) to implement the enhanced CSG handling as discussed herein. For example, when existing hardware architecture of the communication node 56 cannot be modified, the enhanced CSG handling methodology according to one embodiment of the present invention may be implemented through suitable programming of one or more processors (e.g., processor 95 (or, more particularly, processing unit 99) in FIG. 12) in the communication node 56. The execution of the program code (by a processor in the node 56) may cause the processor to provide an enhanced SI (for enhanced CSG handling) as discussed herein. Thus, in the discussion below, although the communication node 56 may be referred to as "performing," "accomplishing," or "carrying out" a function or process, it is evident to one skilled in the art that such performance may be technically accomplished in hardware and/or software as desired. Similarly, the UE 52 may be suitably configured (in hardware and/or software) to perform its portion of PLMN selection, CSG Indication checking, CSG-ID transmission (to the base station or HeNB 56), etc., as discussed in more detail below.

It is observed here that, when network-sharing is employed, the communication node 56 may be part of a Radio Access Network (RAN) (not shown in FIG. 5) in the carrier network 54. The RAN may be shared by multiple core networks (not shown) from different operators, thereby requiring the communication node 56 to provide radio resource management (with/without added RNC functionalities) for enhanced CSG handling as per the teachings of the present invention. The carrier network 54 may be an operator-specific PLMN. In case of network-sharing, many such PLMNs (not shown) from different operators may share the RAN (not shown) in the carrier network 54. For ease of illustration, only one such network configuration 50 is illustrated in FIG. 5.

Figure 2:
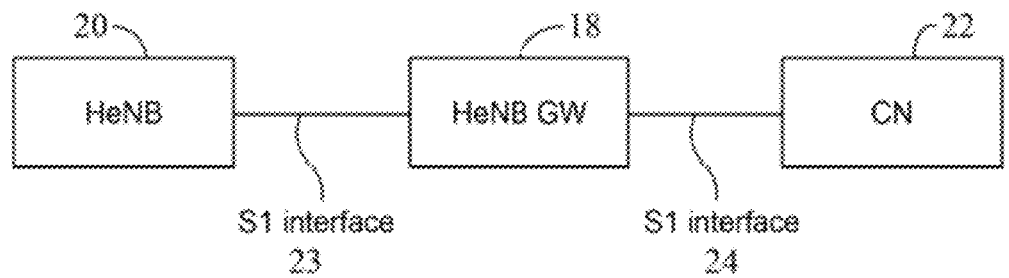
FIG. 2 shows a Home eNodeB (HeNB) logical architecture in E-UTRAN.
Figure 3:
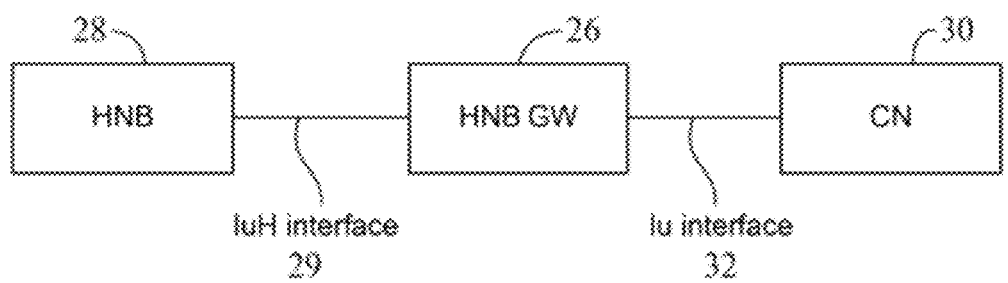
FIG. 3 depicts a Home Node-B (HNB) logical diagram in UTRAN.
Figure 4:
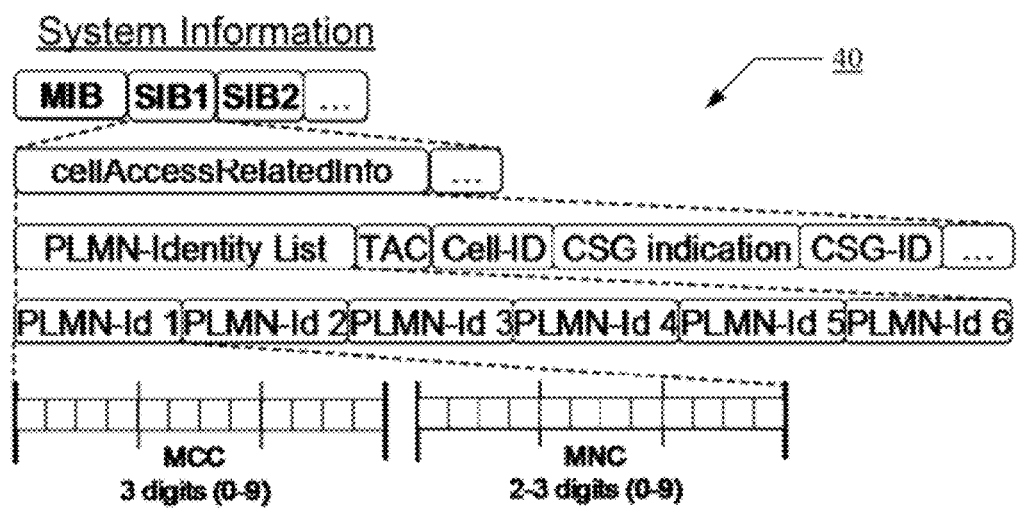
FIG. 4 illustrates various System Information Blocks (SIBs) of System Information (SI) in E-UTRAN.

The carrier network 54 may include a core network 58 coupled to the communication node 56 and providing logical and control functions (e.g., subscriber account management, billing, subscriber mobility management, etc.) in the network 54. In one embodiment, the communication node 56 may be connected to the core network 58 via a suitable gateway (e.g., HeNB GW or HNB GW as illustrated in FIGS. 2 and 3, respectively). In case of an LTE carrier network, the core network 58 may be an Evolved Packet Core (EPC). Regardless of the type of carrier network 54, the core network 58 may function to provide connection of the UE 52 to other mobile handsets operating in the carrier network 54 and also to other communication devices (e.g., wireline phones) or resources (e.g., an Internet website) in other voice and/or data networks external to the carrier network 54. In that regard, the core network 58 may be coupled to a packet-switched network 60 (e.g., an Internet Protocol (IP) network such as the Internet) as well as a circuit-switched network 62 such as the Public-Switched Telephone Network (PSTN) to accomplish the desired connections beyond the devices operating in the carrier network 54. Thus, through the communication node's 56 connection to the core network 58 and the handset's 52 radio link with the communication node 56, a user of the handset 52 may wirelessly (and seamlessly) access many different resources or systems beyond those operating within the carrier network 54 of an operator.

As is understood, the carrier network 54 may be a cellular telephone network or a PLMN in which the UE 52 may be a subscriber unit. However, as mentioned before, the present invention is operable in other non-cellular wireless networks as well (whether voice networks, data networks, or both). Furthermore, portions of the carrier network 54 may include, independently or in combination, any of the present or future wireline or wireless communication networks such as, for example, the PSTN, or a satellite-based communication link. Similarly, as also mentioned above, the carrier network 54 may be connected to the Internet via its core network's 58 connection to the IP (packet-switched) network 60 or may include a portion of the Internet as part thereof.

As mentioned before, particular embodiments of the present invention enable the indication of multiple CSG IDs and CSG Indications in the system information (e.g., the enhanced SI structure discussed hereinbelow) sent on the cell broadcast channel (e.g., on the Physical Broadcast Channel (PBCH) or on the Physical Downlink Shared Channel (PDSCH) configured to carry a broadcast message), making it possible to support different CSG IDs and CSG Indications for every PLMN Identity (PLMN ID) as well as having PLMN Identities (PLMN IDs) with multiple associated CSG IDs and CSG Indications. This makes it possible to have different CSG IDs for different operators and even have multiple CSG IDs for one operator (PLMN). Furthermore, this enhanced CSG handling according to the teachings of the present invention also makes it possible to use the CSG concept selectively—i.e., for some PLMNs (as given by the CSG indication), but not for all.

Figure 6:
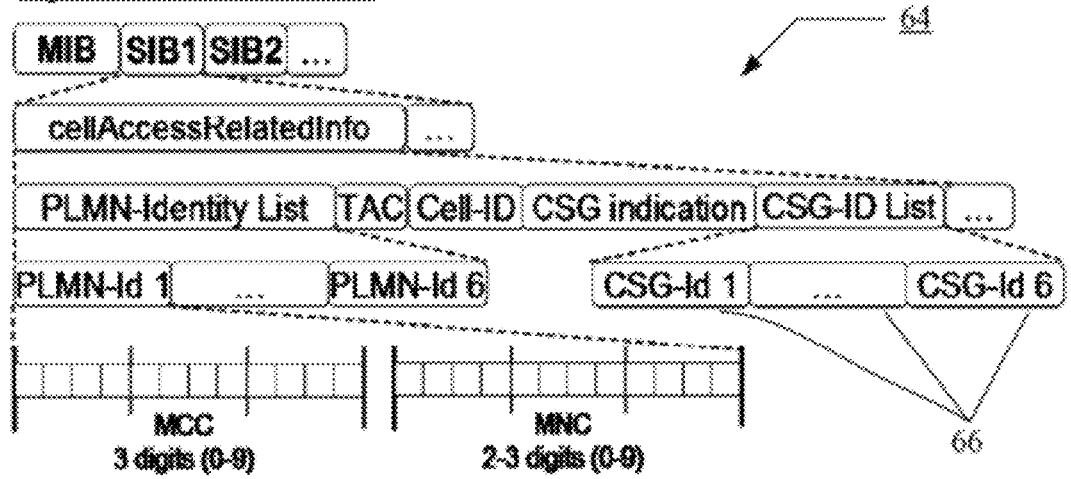
FIG. 6 is an exemplary depiction of an enhanced SI structure for E-UTRAN according to one embodiment of the present invention.

FIG. 6 is an exemplary depiction of an enhanced SI structure for E-UTRAN according to one embodiment of the present invention. It is noted here that the terms "enhanced SI structure" and "enhanced SI" are used interchangeably herein to essentially refer to the enhanced System Information (discussed with reference to FIGS. 6-9) according to the teachings of the present invention. In the embodiment of FIG. 6, an enhanced SI structure 64 enables the indication of different CSG IDs for every PLMN Identity (PLMN-Id) sent in the SI 64. As mentioned earlier, up to six (6) different PLMN IDs may be sent through System Information Block type-1 (SIB1) in the SI 64. Thus, in the SI 64 in FIG. 6, six different CSG-IDs—collectively referred to by reference numeral "66"—are shown to have been included in the CSG-ID List field of the SIB1. Each CSG-ID 66 is PLMN-specific—i.e., CSG-Id 1 applies for PLMN-Id 1, CSG-Id 2 applies for PLMN-Id 2, and so on. If there are less than six PLMN IDs in the PLMN-ID List, then the enhanced SI 64 may contain less than six CSG IDs to maintain one-to-one correspondence with PLMN IDs in the PLMN-ID List. The "CSG Indication" may also be split into several instances, one per PLMN. That is not shown in FIG. 6 in order to simplify the drawing, but illustrated in more detail in FIG. 8 discussed later hereinbelow.

It is noted that each set of [PLMN ID; CSG ID] may have some associated data. According to current standards, carrier frequencies with only CSG cells need not be broadcasted. For carrier frequencies with mixed CSG and non-CSG cells, SIB4 may include a list of PCIs (Physical Cell IDs) allocated to CSG cells and the UE considers this list valid for 24 hours. These data assist the UE in saving battery life by reducing the UE's "autonomous search". Similar information per PLMN ID may also be provided.

The enhanced SI 64 may be sent by the HeNB 56 to the UE 52 when, for example, enhanced CSG handling is needed to support network-sharing. At other times, the traditional SI 40 may be used instead. Alternatively, the HeNB 56 may always send the enhanced SI 64 regardless of the CSG handling requirements.

It is observed here that although a detailed architecture of internal UE layers is not relevant to the present discussion and is not shown here for the sake of brevity, a brief overview of PLMN selection by a UE is provided in the context of various operational layers in the UE. It is understood that PLMN selection is generally an ongoing process in the upper layers (i.e., the Mobility Management (MM) sub-layer of the Non-Access Stratum layer (NAS)) of a UE (e.g., the UE 52 in FIG. 5). The initial UE process of choosing the strongest cell (frequency) is known as "camping on a cell". The Radio Resource Control sub-layer (RRC)/Physical layer (PHY) in a UE find available PLMNs and report them to layers above. Decision of choosing the PLMN may be done by the NAS layer (MM sublayer). MM itself may use PLMN information available in UE's Subscriber Information Module (SIM) to decide which PLMN to select from the available PLMNs reported by RRC/PHY (which may receive a list of available PLMNs through, for example, the PLMN-ID List in the SI from a base station). After the decision from NAS, RRC/PHY may choose the best cell (based on cell selection criteria—e.g., strongest frequency) in PLMN selected by NAS. It is noted here that even though initial cell selection is done, PHY layer may regularly look for a signal-wise "better" cell (radio conditions change as user moves from one place to another). This procedure is known as a "cell re-selection" procedure and is similar to the cell selection procedure briefly discussed herein.

Successful PLMN selection results in that the UE is camping on a so called Registered PLMN (RPLMN), and the UE may also receive a list of equivalent PLMNs (EPLMN) from the PLMN (e.g., the PLMN with which the UE is currently communicating). In one embodiment, an RPLMN may be a cellular service subscriber's Home PLMN (HPLMN). An HPLMN may be a PLMN to which the subscriber belongs (as indicated, e.g., by information stored in UE's SIM card), as opposed to a Visitor PLMN (VPLMN) in which the subscriber is roaming. In another embodiment, RPLMN may be the PLMN that was last-registered by the UE (i.e., to which the UE had successfully attached). Such last-registered PLMN may be stored in UE's memory (e.g., memory 94 in FIG. 11). The current PLMN may provide an EPLMN list to a UE (e.g., the UE 52) identifying all PLMNs that are regarded as "equivalent" to each other (based on their combination of Mobile Country Code (MCC) and Mobile Network Code (MNC)) and that the UE should treat as equivalent for the purpose of PLMN selection, cell selection/re-selection, and handover. This EPLMN list along with an added entry for the PLMN of the current network 54 may be stored by the UE 52 in its memory 94 (FIG. 11), and the list may remain stored in the UE even when UE is switched off so that the list can be used for PLMN selection after switch on. The EPLMN list can be signaled to the UE (e.g., by the network 54 through the HeNB 56) as part of the location area update, routing area update, or GPRS attach procedures, but it could not be possibly signaled on the cell broadcast channel (e.g., PBCH). On the other hand, as mentioned before, the SI may be sent on the cell broadcast channel.

A UE (e.g., the UE 52 in FIG. 5) may detect that an HeNB is a Shared HeNB (e.g., the HeNB 56 in FIG. 5)—e.g., by presence of multiple PLMN IDs in the enhanced SI from the HeNB 56. When the UE 52 detects that the HeNB 56 is a Shared HeNB, the UE 52 can read the broadcasted PLMN IDs in the SI and select one of these PLMN IDs based on the previous PLMN selection (i.e., only RPLMN or any EPLMN may be selected). The previous PLMN selection may be available from the EPLMN list stored in UE's memory as discussed above. The UE 52 may then indicate the selected PLMN to the Shared HeNB 56 as part of the RRC Connection establishment. This intimation from the UE is currently supported by the RRC Connection Request procedure, but not at "inbound mobility to CSG cell". In one embodiment, as long as there is a single CSG-ID for each PLMN-ID (as shown, for example, in FIG. 6), there may be no need for the UE 52 to indicate the selected PLMN's CSG-ID separately. Because of one-to-one correspondence between PLMN IDs and CSG IDs in the SI 64 in the embodiment of FIG. 6, this means that the PLMN-ID indicated to the Shared HeNB 56 also indicates the CSG-ID to be used, for example in the signaling between the Shared HeNB 56 and the MME (in the core network 58).

Figure 7:
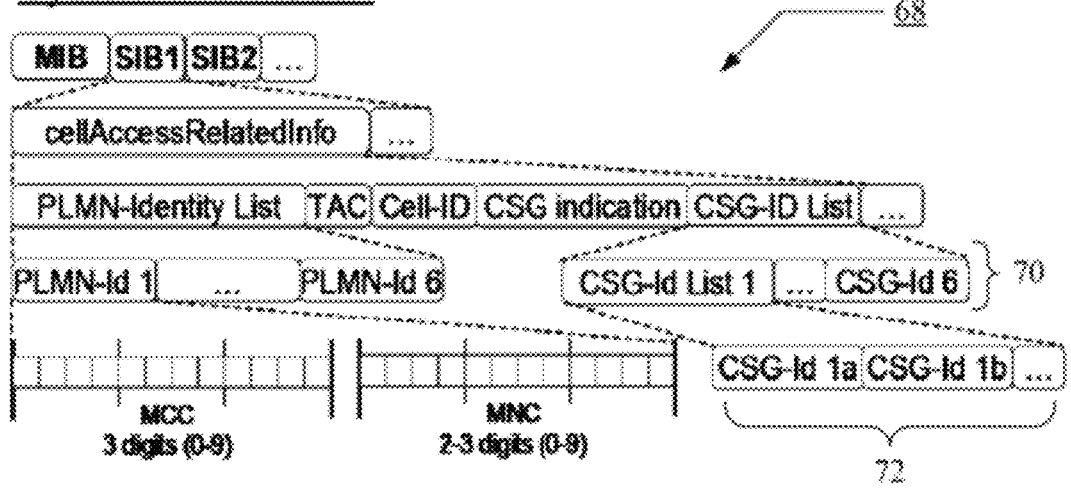
FIG. 7 is another exemplary depiction of an enhanced SI structure for E-UTRAN according to one embodiment of the present invention.

FIG. 7 is another exemplary depiction of an enhanced SI structure 68 for E-UTRAN according to one embodiment of the present invention. In the embodiment of FIG. 7, the principle of PLMN-specific CSG-ID is further extended by allowing a list of CSG sub-identifiers for one or more of the PLMN IDs in the enhanced SI 68. Thus, as shown in FIG. 7, the CSG-ID List may not only include PLMN-specific CSG-ID parameters 70 (which are similar to the CSG IDs 66 in FIG. 6), but may also include CSG sub-identifiers for one or more of these CSG IDs (i.e., CSG-Id1 through CSG-ID6 in FIG. 7). In FIG. 7, the CSG-ID 1 parameter is shown to constitute CSG sub-identifiers 72 including CSG-Id 1*a*, CSG-Id 1*b*, etc. Thus, it may be then possible to indicate two or more separate CSG IDs for a single PLMN Id with the use of the concept of CSG sub-identifiers. One example of this is to have CSG Id 1*a* and 1*b* for the PLMN Id 1 as shown in FIG. 7. In the embodiment of FIG. 7, in addition to intimating the selected PLMN to the Shared HeNB 56, the UE 52 may also need to indicate the selected PLMN's CSG sub-identifier(s) in the signaling to the HeNB 56. The UE 52 may select and report one or more of the available CSG sub-identifiers for the CSG-ID ID of the UE-selected PLMN. Although not shown in FIG. 7, it is understood that other PLMN IDs (e.g., PLMN Id 2, 3, etc.) in the SI 68 may be similarly provided with corresponding CSG sub-identifiers.

The intimation of selected PLMN and CSG by the UE to the network may occur in different procedures. One procedure is when the UE performs cell reselection to the HeNB cell. In this case the UE informs the target HeNB cell of the selected PLMN and CSG. Another procedure is when the UE performs so-called "inbound handover" towards an HeNB. In the latter case, the UE informs the source HeNB cell about the selected PLMN and CSG.

As mentioned above, it is not possible in the current 3GPP specification that an HeNB broadcasts multiple CSG IDs. Using the current specifications, the HeNB may not support multiple CSG Ds or a single UE may not be a member of more than one of these CSG IDs. The mechanism in FIG. 7 to indicate the selected CSG IDs (through CSG sub-identifiers) to the network 54 could be even further extended so that the HeNB 56 can broadcast multiple CSG IDs (and corresponding sub-identifiers) and the UE 52 can select all the allowed CSG IDs and their sub-identifiers (according to an Allowed CSG List (not shown) stored in the UE by, e.g., the operator of UE's HPLMN) and signal them to the network 54. The network 54 (e.g., through an MME in the CN 58) may check the UE's access rights to the different CSGs (i.e., the CSGs corresponding to the CSG IDs and sub-identifiers received from the UE) and select one of these CSGs, for example, for the UE 52 to camp on. The HeNB 56 may then allow the UE 52 to access this selected CSG as per UE's access rights.

Figure 8:
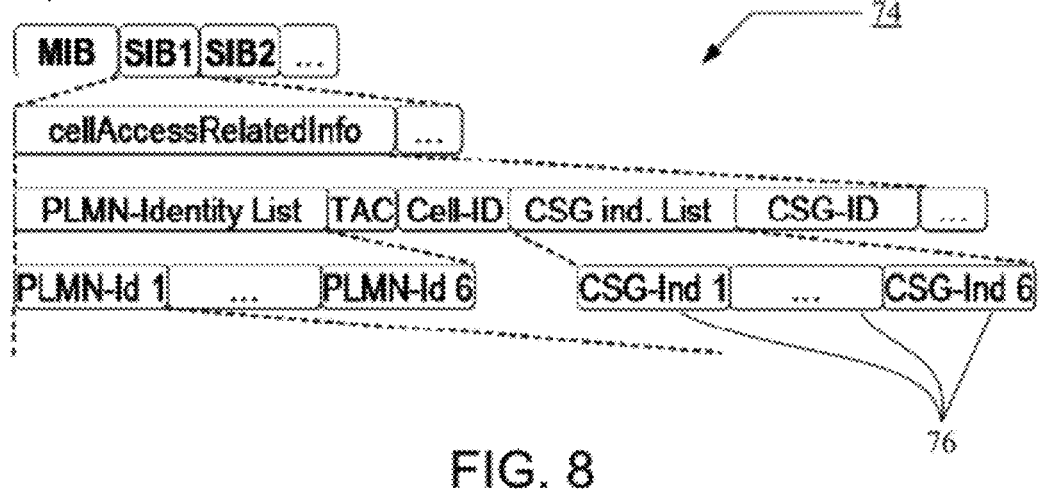
FIG. 8 is an additional exemplary depiction of an enhanced SI structure for E-UTRAN according to one embodiment of the present invention.

FIG. 8 is an additional exemplary depiction of an enhanced SI structure 74 for E-UTRAN according to one embodiment of the present invention. The enhanced SI 74 in FIG. 8 enables the indication of different, PLMN-specific CSG Indications 76 for every PLMN Identity sent in the system information. Thus, in the SI 74 in FIG. 8, the CSG Indication 1 ("CSG-Ind 1") applies for PLMN Id 1, CSG-Ind 2 applies for PLMN Id 2, and so on. Thus, like the embodiment in FIG. 6, there may be a one-to-one correspondence between a PLMN-ID and a CSG Indication in the embodiment of FIG. 8.

Figure 9:
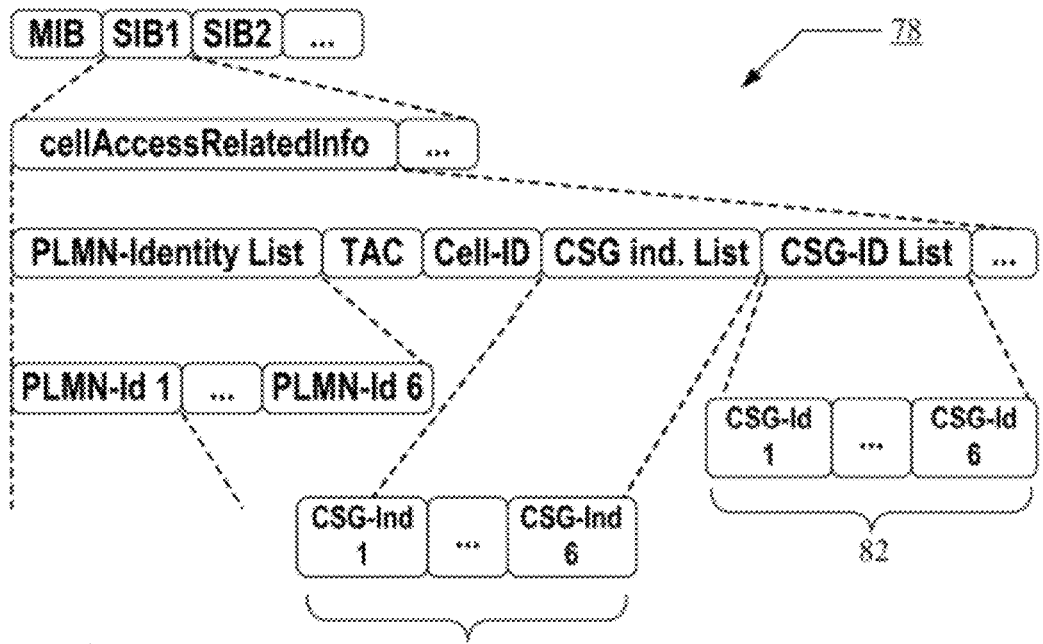
FIG. 9 illustrates an enhanced SI structure that may be generated when the embodiments in FIGS. 7 and 8 are implemented simultaneously.

It is observed here that the exemplary SI structures 64 and 74 (in FIGS. 6 and 8, respectively) separately show the extensions to CSG-ID and CSG Indication handling. However, in particular embodiments (e.g., the embodiment in FIG. 9), an enhanced SI structure may utilize these two extensions simultaneously. FIG. 9 illustrates an enhanced SI structure 78 that may be generated when the embodiments in FIGS. 6 and 8 are implemented simultaneously. The enhanced SI 78 may simultaneously indicate multiple PLMN-specific CSG Indications 80 (as in case of FIG. 8) and multiple PLMN-specific CSG IDs 82 (as in case of FIG. 6) for each of the plurality of PLMNs identified (through the PLMN-ID List) in the SI 78. Although not shown in FIG. 9, additional PLMN-specific CSG sub-identifiers (as in case of FIG. 7) also may be included in the enhanced SI 78.

Figure 1:
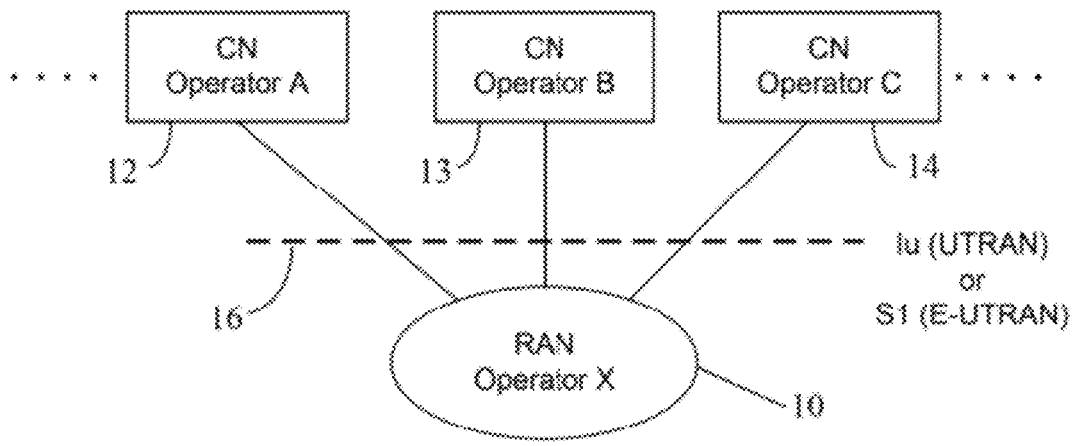
FIG. 1 is a simplified illustration of a Multi-Operator Core Network (MOCN) configuration in 3GPP.

Thus, particular embodiments of the present invention enable the indication of different CSG IDs and CSG Indications for every PLMN Identity sent in the System Information. The indications of multiple allowed CSG IDs (FIG. 6) with/without sub-identifiers (FIG. 7), and/or the indications of multiple CSG Indications (FIGS. 8-9) may be facilitated by adding such indications, for example, in the RRC Connection establishment signaling (e.g., between the HeNB 56 and the UE 52), signaling (e.g., to the core network 58) over the S1-MME interface (e.g., as illustrated in FIGS. 1-2), and in the measurement reports for Handover into CSG cells. In one embodiment, the UE 52 may use a Physical Uplink Control Channel (PUCCH) signal, or (an extended) Physical Random Access Channel (PRACH) signal, or a Physical Uplink Shared Channel (PUSCH) signal to indicate selected CSG IDs (and/or CSG sub-identifiers) and CSG Indications to the HeNB 56.

Figure 10:
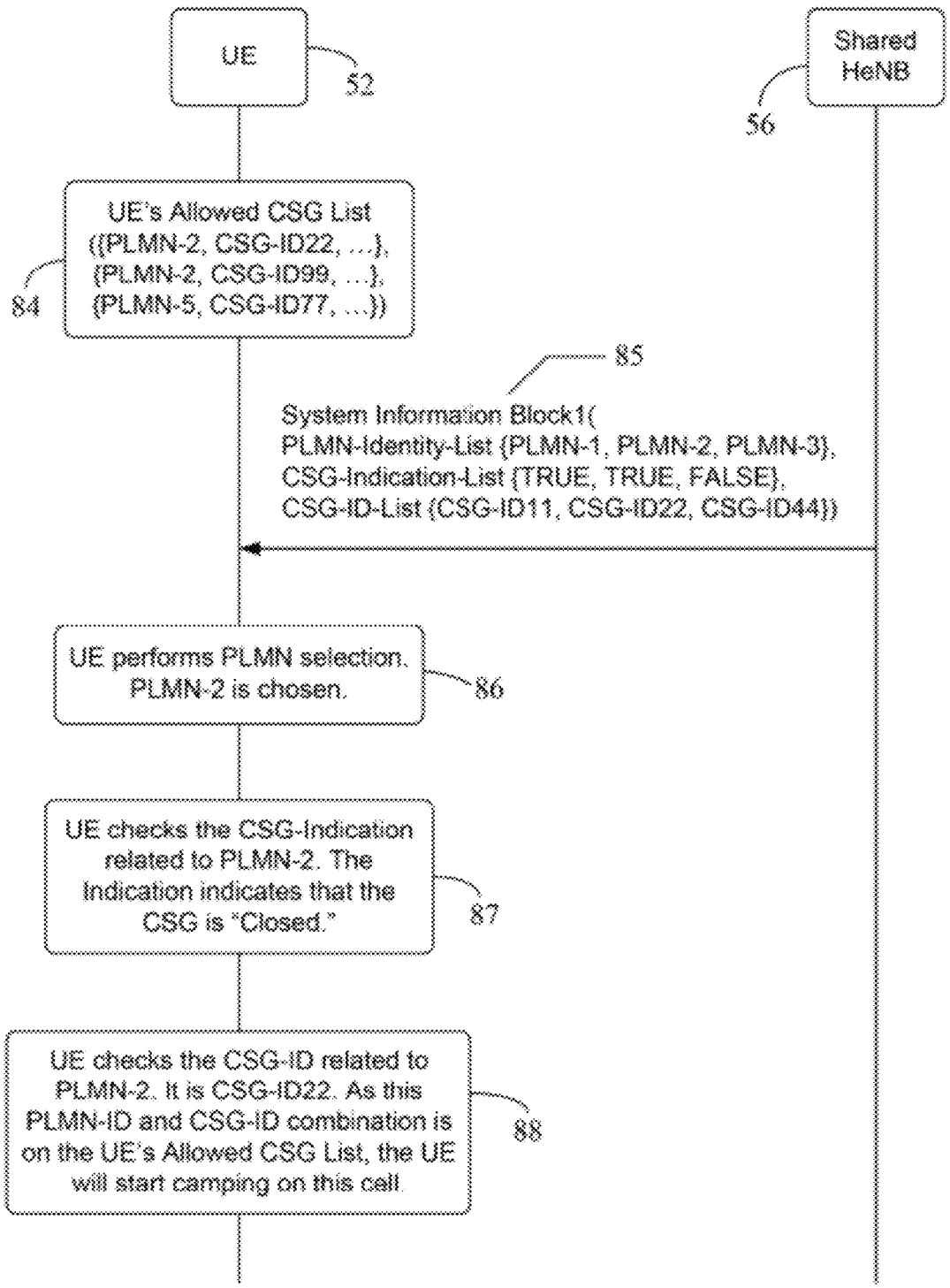
FIG. 10 shows an exemplary set of CSG selection actions that may be performed by a UE in response to an SIB1 message from an HeNB according to one embodiment of the present invention.

FIG. 10 shows an exemplary set of CSG selection actions that may be performed by a UE (e.g., the UE 52 in FIG. 5) in response to an SIB1 message from an HeNB (e.g., the HeNB 56 in FIG. 5) according to one embodiment of the present invention. By way of example, the UE 52 may have stored (e.g., in the memory 94 in FIG. 11) an Allowed CSG List with three different entries as indicated at block 84 in FIG. 10. This List may have been stored in the UE by the operator of UE's network (e.g., HPLMN or RPLMN) based on UE's users subscription to the network or later by the network (e.g., through RRC signaling) upon UE's initial access to the network. The UE may also receive the Allowed CSG List from an Open Mobile Alliance Device Management (OMA DM) server (as discussed, for example, in TS 24.285). In one embodiment, UE's manufacturer may store such List as well in view of network operator-specific requirements. In one embodiment, the UE may locally amend the List at "Manual CSG Selection", if the network accepts the location update attempt (as discussed, for example, in TS 24.301). For ease of discussion, only the PLMN-ID and the CSG-ID is shown in FIG. 10 for each entry in the UE-based Allowed CSG List. Additional entries (e.g., "HNB Name," "CSG Type," a default priority field within each entry, or an indication that a specific entry can only be accessed in emergency situation, etc.) in the List at block 84 are omitted for the sake of brevity. It is seen from block 84 that one of the entries in the UE's Allowed CSG List is {PLMN-2, CSG-ID22}.

The Shared HeNB 56 may broadcast the System Information Block type 1 (SIB1) message 85 to the UE 52 (and also to other UEs (not shown) in the cell) indicating to the UE 52 that the HeNB 56 is shared among three different operators (as indicated by the three different PLMN-IDs—PLMN-1, PLMN-2, and PLMN-3—in the SIB1 message). HeNB 56 thus broadcasts information about all these PLMNs through the SIB1 message 85, which may contain additional information (not shown in FIG. 10 for the sake of brevity) similar to the SIB1 in the enhanced SI 78 in FIG. 9. For each PLMN, a separate CSG Indication and CSG-ID are also indicated in the SIB1 message as can be seen in FIG. 10.

In one embodiment, due to SIB1 size constraints, caused by coverage requirements, SIB1 may not be able to include the additional information. The added information may be then included in other SIBs or possibly, e.g., through a new extension of SIB1. In the latter case, the current SIB1 may include an indicator that "Cell Access Related Information" is extended, so that the UE also reads this (updated) information before judging if the cell is "suitable" for camping.

The UE 52 may perform PLMN selection (or the UE may have already performed this PLMN selection earlier in the manner discussed hereinbefore). In any event, by way of example, it is seen from block 86 in FIG. 10 that UE's currently registered (or selected) PLMN is PLMN-2. When the UE 52 enters the coverage of the Shared HeNB 56, it receives the SIB1 message 85 and checks SIB1's contents. As UE's currently registered PLMN is PLMN-2, the UE 52 may be mainly interested in information related to this PLMN. First, as indicated at block 87, the UE 52 may check the CSG Indication for PLMN-2 and may find out that the HeNB's cell is a Closed CSG cell for this PLMN-2 (as the CSG Indication for this PLMN is "TRUE" in the SIB1 message 85). It is understood that when a CSG Indication field is set to "TRUE," the UE may be only allowed to access the CSG cell if the corresponding PLMN's CSG-ID matches an entry in the UE-based Allowed CSG List. Thus, in the example in FIG. 10, the UE may then check, as indicated at block 88 in FIG. 10, the CSG-ID (in the received SIB1 message 85) for PLMN-2 and may find out that this value is CSG-ID22. As the UE 52 holds the combination {PLMN-2, CSG-ID22} in its Allowed CSG List (block 84, FIG. 10), it knows that it is allowed to access this cell associated with the Shared HeNB 56. The UE 52 may then. "camp on" this CSG cell.

As mentioned above in conjunction with discussion of FIG. 7, in one embodiment, in addition to the steps illustrated in FIG. 10, the UE 52 may also indicate to the network (through the HeNB 56) in further signaling which CSG-ID it is accessing when performing the network access. Thus, in the embodiment of FIG. 10, the UE 52 may send the CSG-ID22 (of PLMN-2) to the network when the UE finds a matching entry for this CSG-ID in its Allowed CSG List. If CSG sub-identifiers (as discussed with reference to FIG. 7) are also provided in the SIB1 message from the Shared HeNB, the UE may also report one or more of these sub-identifiers to the HeNB (as discussed hereinbefore) when there are matching entries for these sub-identifiers in UE's Allowed CSG List.

Figure 11:
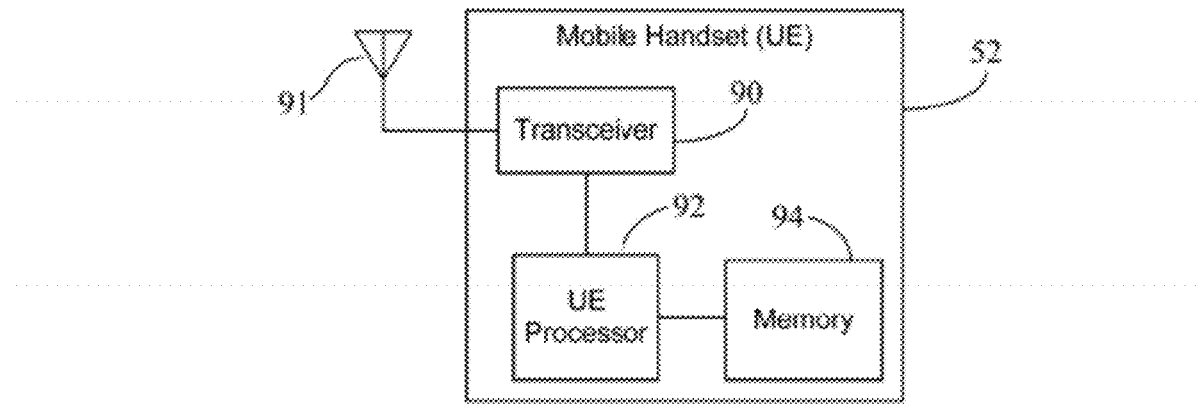
FIG. 11 is a block diagram of an exemplary mobile handset or UE according to one embodiment of the present invention.

FIG. 11 is a block diagram of an exemplary mobile handset or UE 52 according to one embodiment of the present invention. The UE 52 may include a transceiver 90, an antenna 91, a processor 92, and a memory 94 (which may, in some embodiments, also include memory on UE's SIM card). In particular embodiments, some or all of the functionalities described above (e.g., reception of SI from the HeNB 56 via the antenna 91 and transceiver 90; storage of EPLMN list and Allowed CSG List in the memory 94; transmission of PLMN selection information and CSG-ID and CSG sub-identifiers for the selected PLMN to HeNB 56 via transceiver 90 and antenna 91; etc.) as being provided by mobile communication devices or other forms of UE may be provided by the UE processor 92 executing instructions stored on a computer-readable medium, such as the memory 94 shown in FIG. 11. Alternative embodiments of the UE 52 may include additional components beyond those shown in FIG. 11 that may be responsible for providing certain aspects of the UE's functionality, including any of the functionality described above and/or any functionality necessary to support the solution described above.

Figure 12:
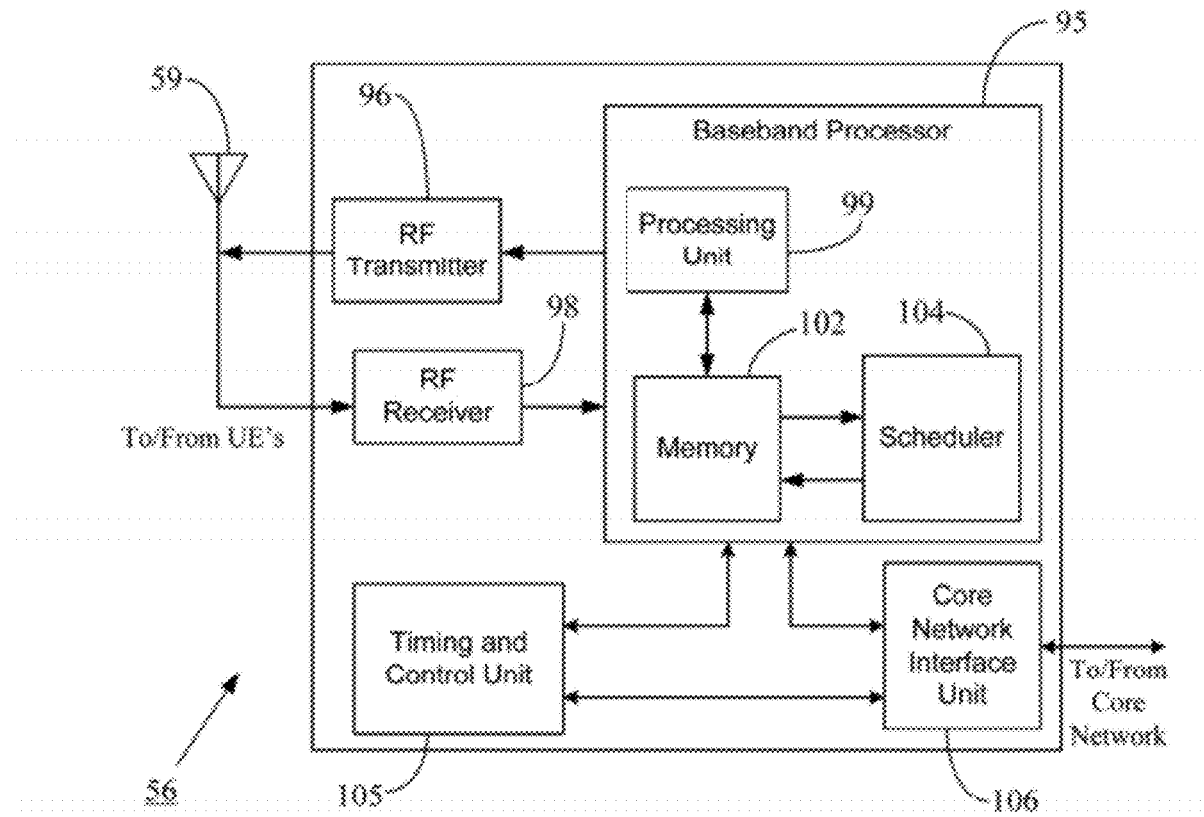
FIG. 12 is a block diagram of an exemplary HeNB or a similar mobile communication node (or base station) according to one embodiment of the present invention.

FIG. 12 is a block diagram of an exemplary HeNB or a similar mobile communication node (or base station) 56 according to one embodiment of the present invention. The HeNB 56 may include a baseband processor 95 to provide radio interface with the mobile handsets (in the carrier network 54) via HeNB's Radio Frequency (RF) transmitter 96 and RF receiver 98 units coupled to the HeNB antenna 59. The processor 95 may be configured (in hardware and/or software) to provide enhanced SI to the UE 52 as per the teachings of the present invention. In one embodiment, the processor 95 may also receive various intimations from the UE 52 (e.g., intimation of selection of PLMN and its CSG-ID, etc.) via the receiver 98, whereas HeNB's transmissions to the UE 52 may be carried out via the transmitter 96. The baseband processor 95 may include a processing unit 99 in communication with a memory 102 to process and store relevant information for the cell. A scheduler (e.g., the scheduler 104 in FIG. 12) in the HeNB 56 may provide the scheduling decision for UE 52 based on a number of factors such as, for example, QoS (Quality of Service) parameters, UE buffer status, uplink channel quality report received from UE 52, UE capabilities, etc. The scheduler 104 may have the same data structure as a typical scheduler in an eNB in an LTE system.

The processor 95 may also provide additional baseband signal processing (e.g., mobile device registration, channel signal information transmission, radio resource management, etc.) as required. The processing unit 99 may include, by way of example, a general purpose processor, a special purpose processor, a conventional processor, a digital signal processor (DSP), a plurality of microprocessors, one or more microprocessors in association with a DSP core, a controller, a micro-controller, Application Specific Integrated Circuits (ASICs), Field Programmable Gate Arrays (FPGAs) circuits, any other type of integrated circuit (IC), and/or a state machine. Some or all of the functionalities described above as being provided by a mobile base station, a base station controller, a node B, an enhanced node B, an HeNB, an HNB, a home base station, a femtocell base station, and/or any other type of mobile communications node may be provided by the processing unit 99 executing instructions stored on a computer-readable data storage medium, such as the memory 102 shown in FIG. 12.

The HeNB 56 may further include a timing and control unit 105 and a core network interface unit 106 as illustrated in FIG. 12. The control unit 105 may monitor operations of the processor 95 and the network interface unit 106, and may provide appropriate timing and control signals to these units. The interface unit 106 may provide a bi-directional interface for the HeNB 56 to communicate with the core network 58 to facilitate administrative and call-management functions for mobile subscribers operating in the carrier network 54 through HeNB 56.

Alternative embodiments of the base station 56 may include additional components responsible for providing additional functionality, including any of the functionality identified above and/or any functionality necessary to support the solution described above. Although features and elements are described above in particular combinations, each feature or element can be used alone without the other features and elements or in various combinations with or without other features and elements. The methodology provided herein (related to CSG handling through enhanced SI) may be implemented in a computer program, software, or firmware incorporated in a computer-readable storage medium (e.g., the memory 102 in FIG. 12 and memory 94 in FIG. 11) for execution by a general purpose computer or a processor (e.g., the processor 92 in FIG. 11 and processing unit 99 in FIG. 12). Examples of computer-readable storage media include a Read Only Memory (ROM), a Random Access Memory (RAM), a digital register, a cache memory, semiconductor memory devices, magnetic media such as internal hard disks, magnetic tapes and removable disks, magneto-optical media, and optical media such as CD-ROM disks and Digital Versatile Disks (DVDs).

The foregoing describes a system and method for enhanced support for handling of Closed Subscriber Groups (CSGs) and RAN-sharing for home base stations and other small cells. The present invention enables indication of multiple CSG IDs and CSG Indications in the System Information (SI) sent on the cell broadcast channel, thereby making it possible to support different CSG IDs and CSG Indications for every PLMN Identity (PLMN-ID) and also to support a PLMN-ID with multiple associated CSG IDs and CSG Indications. This makes it possible to have different CSG IDs for different operators and even to have multiple CSG IDs for one operator (i.e., a single PLMN). The present invention also makes it possible to selectively use the CSG concept for some PLMNs (as given by their respective CSG Indications), but not for all. The present invention thus improves the possibility to cost-effectively provide enhanced support for RAN-sharing for HeNBs or other base stations using a network's existing radio resources and signaling framework (i.e., without significant disruption to network architecture or functionality). This enhanced support may be useful in opening up new business cases where third party operators deploy a network of base stations (e.g., a RAN) that can be shared by multiple operators, leading to better cellular coverage, peak rates, and capacity.

It is noted here that although the foregoing discussion focuses on sharing of HeNBs through enhanced SI in E-UT-RAN, the teachings of the present invention are exemplary in nature and are not confined to implementation in E-UTRAN only. Rather, the teachings of the present invention related to enhanced support for CSG-handling and RAN-sharing through enhanced SI may be applied, with suitable modifications (as may be apparent to one skilled in the art using the present teachings), to other wireless systems or networks as well, such as, for example, networks/systems using 3G/4G specifications. Some examples of such systems or networks include, but not limited to, Global System for Mobile communications (GSM) networks, LTE networks, LTE-Advanced networks, UTRAN networks, Wideband Code Division Multiple Access (WCDMA) systems, WCDMA-based HSPA systems, CDMA2000 systems, GSM/Enhanced Data Rate for GSM Evolution (GSM/EDGE) systems, and WiMAX systems.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of communicating Closed Subscriber Group (CSG)-related information with a User Equipment (UE) that is in wireless communication with a processor, the method comprising:

using the processor, providing to the UE, System Information (SI) containing at least one of the following:
 a plurality of different Public Land Mobile Network (PLMN)-specific CSG Identity (ID) parameters, wherein a different PLMN-specific CSG ID parameter is associated with each of a plurality of PLMNs identified in the SI, and
 a plurality of different PLMN-specific CSG Indication parameters, wherein a different PLMN-specific CSG Indication parameter is associated with each of the plurality of PLMNs identified in the SI; and
using the processor, receiving from the UE a first intimation of a PLMN selected by the UE from the plurality of PLMNs identified in the SI.

2. The method of claim 1, wherein at least one of the plurality of PLMN-specific CSG-ID parameters in the SI includes a corresponding plurality of PLMN-specific CSG sub-identifiers.

3. The method of claim 1, further comprising:
using the processor, receiving from the UE a second intimation of a PLMN-specific CSG-ID parameter for the PLMN selected by the UE.

4. The method of claim 3, wherein the PLMN-specific CSG-ID parameter for the UE-selected PLMN includes a plurality of PLMN-specific CSG sub-identifiers for the UE-selected PLMN, and wherein receiving the second intimation includes:
receiving at least one of the plurality of CSG sub-identifiers from the UE as part of the second intimation.

5. A method of communicating Closed Subscriber Group (CSG)-related information with a processor that is in wireless communication with a User Equipment (UE), the method comprising:

the UE receiving from the processor, System Information (SI) containing at least one of the following:
 a plurality of different Public Land Mobile Network (PLMN)-specific CSG Identity (ID) parameters, wherein a different PLMN-specific CSG ID parameter is associated with each of a plurality of PLMNs identified in the SI, and a plurality of different PLMN-specific CSG Indication parameters, wherein a different PLMN-specific CSG Indication parameter is associated with each of the plurality of PLMNs identified in the SI; and the UE sending to the processor a first intimation of a PLMN selected by the UE from the plurality of PLMNs identified in the SI.

6. The method of claim 5, further comprising:

the UE sending to the processor a second intimation of a PLMN-specific CSG-ID parameter for the PLMN selected by the UE.

7. The method of claim 6, wherein the PLMN-specific CSG-ID parameter for the UE-selected PLMN includes a plurality of PLMN-specific CSG sub-identifiers for the UE-selected PLMN, and wherein the UE sending the second intimation includes:

the UE sending at least one of the plurality of CSG sub-identifiers as part of the second intimation to the processor.

8. The method of claim 6, wherein the UE sending the second intimation includes:

the UE checking a list of allowed CSGs stored therein to determine whether there is a matching entry in the list for the PLMN-specific CSG-ID parameter for the PLMN selected by the UE; and the UE sending the second intimation to the processor when the matching entry is present in the list of allowed CSGs.

9. The method of claim 8, wherein the UE checking the list of allowed CSGs includes:

the UE checking a PLMN-specific CSG Indication parameter in the SI for the PLMN selected by the UE; and the UE checking the list of allowed CSGs when the PLMN-specific CSG Indication parameter for the PLMN selected by the UE indicates that the UE-selected PLMN is a closed CSG cell.

10. The method of claim 5, wherein the UE sending the first intimation to the processor includes one of the following:

the UE selecting a Registered Public Land Mobile Network (RPLMN) from the plurality of PLMNs identified in the SI;

the UE selecting that PLMN from the plurality of PLMNs identified in the SI which is also listed in a list of allowed CSGs stored in said UE; and the UE selecting an Equivalent Public Land Mobile Network (EPLMN) from the plurality of PLMNs identified in the SI.

11. A mobile communication node configured to provide a radio interface to a User Equipment (UE), wherein the mobile communication node comprises:

a processor operable to provide System Information (SI) to the UE, the SI containing at least one of the following:

a plurality of different Public Land Mobile Network (PLMN)-specific CSG Identity (ID) parameters, wherein a different PLMN-specific CSG ID parameter is associated with each of a plurality of PLMNs identified in the SI, and a plurality of different PLMN-specific CSG Indication parameters, wherein a different PLMN-specific CSG Indication parameter is associated with each of the plurality of PLMNs identified in the SI; and a receiver operable to receive from the UE a first intimation of a PLMN selected by the UE from the plurality of PLMNs identified in the SI.

12. The mobile communication node of claim 11, wherein the receiver is further operable to receive from the UE a second intimation of a PLMN-specific CSG-ID parameter for the PLMN selected by the UE.

13. The mobile communication node of claim 12, wherein the PLMN-specific CSG-ID parameter for the UE-selected PLMN includes a plurality of PLMN-specific CSG sub-identifiers for the UE-selected PLMN, and wherein the receiver is further operable to receive the second intimation by receiving from the UE as part of the second intimation all those CSG sub-identifiers from the plurality of CSG sub-identifiers that have corresponding matching entries in a list of allowed CSGs stored in the UE.

14. A User Equipment (UE) wirelessly operable with a mobile communication node via a radio interface provided by the mobile communication node, the UE comprises:

a receiver operable to receive System Information (SI) from the mobile communication node, the SI containing at least one of the following:

a plurality of different Public Land Mobile Network (PLMN)-specific CSG Identity (ID) parameters, wherein a different PLMN-specific CSG ID parameter is associated with each of a plurality of PLMNs identified in the SI, and a plurality of different PLMN-specific CSG Indication parameters, wherein a different PLMN-specific CSG Indication parameter is associated with each of the plurality of PLMNs identified in the SI; and a processor operable to send to the mobile communication node a first intimation of a PLMN selected by the UE from the plurality of PLMNs identified in the SI.

15. The UE of claim 14, wherein the processor is further operable to:

send to the mobile communication node a second intimation of a PLMN-specific CSG-ID parameter for the PLMN selected by the UE.

16. The UE of claim 15, wherein the PLMN-specific CSG-ID parameter for the UE-selected PLMN includes a plurality of PLMN-specific CSG sub-identifiers for the UE-selected PLMN, and wherein the processor is operable to send the second intimation by sending at least one of the plurality of CSG sub-identifiers as part of the second intimation to the processor.

17. The UE of claim 16, wherein the processor is operable to send at least one of the plurality of CSG sub-identifiers by sending, as part of the second intimation, all those CSG sub-identifiers from the plurality of CSG sub-identifiers that have corresponding matching entries in a list of allowed CSGs stored in the UE.

18. The UE of claim 15, wherein the processor is operable to send the second intimation by:

checking a PLMN-specific CSG Indication parameter in the SI for the PLMN selected by the UE;

checking a list of allowed CSGs stored in the UE to determine whether there is a matching entry in the list for the PLMN-specific CSG-ID parameter for the PLMN selected by the UE, wherein the list of allowed CSGs is checked when the PLMN-specific CSG Indication parameter for the PLMN selected by the UE indicates that the UE-selected PLMN is a closed CSG cell; and sending the second intimation to the mobile communication node when the matching entry is present in the list of allowed CSGs.

19. The UE of claim 14, wherein the processor is operable to send the first intimation to the mobile communication node by performing one of the following operations:

selecting a Registered Public Land Mobile Network (RPLMN) from the plurality of PLMNs identified in the SI;

selecting that PLMN from the plurality of PLMNs identified in the SI which is also listed in a list of allowed CSGs stored in said UE; and selecting an Equivalent Public Land Mobile Network (EPLMN) from the plurality of PLMNs identified in the SI.

20. A system comprising:
a mobile communication node configured to provide a radio interface to a mobile handset and to also provide to the mobile handset, System Information (SI) including at least one of the following:
  a plurality of different Public Land Mobile Network (PLMN)-specific CSG Identity (ID) parameters, wherein a different PLMN-specific CSG ID parameter is associated with each of a plurality of PLMNs identified in the SI, and
  a plurality of different PLMN-specific CSG Indication parameters, wherein a different PLMN-specific CSG Indication parameter is associated with each of the plurality of PLMNs identified in the SI; and
the mobile handset wirelessly operable with the mobile communication node via the radio interface provided thereby, wherein the mobile handset is configured to send to the mobile communication node a first intimation of a PLMN selected by the mobile handset from the plurality of PLMNs identified in the SI.

21. The system of claim 20, wherein the mobile handset is further configured to send to the mobile communication node a second intimation of a PLMN-specific CSG-ID parameter for the PLMN selected by the mobile handset.

22. The system of claim 21, wherein the PLMN-specific CSG-ID parameter for the PLMN selected by the mobile handset includes a plurality of PLMN-specific CSG sub-identifiers for the mobile handset-selected PLMN, and wherein the mobile handset is configured to send at least one of the plurality of CSG sub-identifiers as part of the second intimation to the mobile communication node.

23. The system of claim 22, wherein the mobile handset is configured to send as part of the second intimation all those CSG sub-identifiers from the plurality of CSG sub-identifiers that have corresponding matching entries in a list of allowed CSGs stored in the mobile handset, and wherein the system further comprises:
  a network node configured to check network access rights of the mobile handset to each CSG corresponding to each CSG sub-identifier received from the mobile handset, and to select a single CSG to which the mobile handset has network access rights, and
  wherein the mobile communication node is configured to allow the mobile handset to access the single CSG.

* * * * *